United States Patent
Seto (10) Patent No.: US 7,333,227 B2
(45) Date of Patent: Feb. 19, 2008

(54) IMAGE DATA MANAGEMENT SERVER, IMAGE PRINTING SERVER AND IMAGE SERVICE SYSTEM

(75) Inventor: Satoshi Seto, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 863 days.

(21) Appl. No.: 10/390,919

(22) Filed: Mar. 19, 2003

(65) Prior Publication Data

US 2003/0179406 A1    Sep. 25, 2003

(30) Foreign Application Priority Data

Mar. 19, 2002    (JP) ............... 2002/076250

(51) Int. Cl.
G06F 15/00    (2006.01)
G06F 15/16    (2006.01)

(52) U.S. Cl. ............... 358/1.15; 358/403; 358/434; 358/438; 707/3; 707/10; 709/203; 709/216

(58) Field of Classification Search ............... 358/1.15, 358/403, 434, 438; 707/3, 10; 709/203, 709/216
See application file for complete search history.

(56) References Cited

U.S. PATENT DOCUMENTS 6,778,289 B1 *   8/2004   Iwata ................. 358/1.15
7,136,179 B2 *   11/2006   Ohara ................. 358/1.15
2002/0015179 A1   2/2002   Igarashi et al.
2003/0074373 A1 *   4/2003   Kaburagi et al. ........ 707/104.1

FOREIGN PATENT DOCUMENTS

JP      2001-344313 A     12/2001
JP      2001345966 A  *   12/2001
JP      2002-007403 A     1/2002

* cited by examiner

Primary Examiner—Douglas Q. Tran
Assistant Examiner—Chan S. Park
(74) Attorney, Agent, or Firm—Sughrue Mion, PLLC.

(57) ABSTRACT

Disclosed herein is an image service system that is capable of dividing the service into an images managing service and a printing service while maintaining the convenience to the user. When a printing processing portion of a first managing server or a second managing server receives a print command from a user's mobile phone, the URL indicating the storage location of the image data as well as the printing conditions are sent to a printing server, the printing server and the user are connected, and the printing related processes are performed by the printing server. The printing server prompts the user to enter the printing conditions, ands sends over a network the printing conditions and the image data downloaded from the location indicated by the received URL to a printing apparatus, which prints out the image(s).

7 Claims, 7 Drawing Sheets

IMAGE DATA MANAGEMENT SERVER, IMAGE PRINTING SERVER AND IMAGE SERVICE SYSTEM

BACKGROUND OF THE INVENTION

1. Field of the Invention

The present invention relates to an image management sever, an image printing server and an image service system for use in a digital image service system provided over a communication network.

2. Description of the Related Art

Until the popularization of digital cameras, the conventional way of making prints employed a photosensitive film containing silver salts, such as silver halide film. Prints made utilizing silver halide photographic film have been used in many ways, such as being shown to friends to communicate the state of affairs when the picture was taken, being sent to acquaintances, being enlarged for use in decorating, being gathered in a photo album, etc. However, if prints made using silver halide photographic film are not maintained in an orderly fashion they can pile up quickly, and for cases in which a film negative or a print becomes lost, it becomes very difficult to recover the image. Further, even if painstaking measures are taken to properly organize prints and negatives, it is very time consuming to separate them into themes and categories. Still further, there are cases in which a user forgets to replace in its original place of storage a portion of negative film that has been taken out, whereby it becomes difficult to maintain the orderly arrangement thereof.

These circumstances and advances in technology have given rise to the practice of storing photographs as digital data using image data that has been obtained by scanning an image recorded on a negative film or obtained by photographing with a digital camera. However, it is often the case that digital image data such as that described above is stored on the hard disk of the personal computer of the user, and transferring the image data when a new computer is purchased is troublesome. Further, there are also cases in which the image data is stored on a storage medium such as a CD-R, producing a risk that image data will be lost if stored thereon for a long period of time due to deterioration of the condition of the storage medium. Still further, there are cases in which an apparatus for reproducing data stored on a certain type of media falls out of production due to its having become obsolescent upon being superceded by a newer technology, and therefore becomes unavailable. In this case, it becomes impossible to reproduce the data.

Therefore, image storage systems, wherein image data is transmitted over a network such as the internet to an image storing server for providing an image data storage service, have been proposed.

According to these image storage systems, image data transmitted directly from the user or from a printing laboratory at the request of the user and obtained by the image storing server is stored therein. It thereby becomes possible for the user to access the aforementioned image storage server by use of a terminal such as a personal computer to peruse the stored image data, and so on. Among such systems is an image data management system, as described in U.S. patent application Ser. No. 10/242,770, which is capable of efficiently managing image data, and also of carrying out print commands for making prints, etc. By use of this system, once image data has been stored in the image data management server, a user can peruse the image data, perform various processes such as organizing the image data, etc. Further, the user can also set printing conditions (e.g. the printing laboratory that is to perform the printing, the print size, number of prints, the type of printing paper, and so on), whereby a print order for desired image data can be carried out. The image managing server causes the specified printing laboratory to print out the images in accordance with the printing conditions set by the user, whereby the user can obtain prints corresponding to the desired specifications.

However, the shortcoming resulting from the above-described convenience with respect to image data management, printing processing and the like afforded by the above-described image storage system to the user is that the image storage server is of a cumbersome and complex configuration. The properties of image management services for storing and organizing image data and image printing systems for performing printing related processes (e.g., reception of printing conditions, the processing for causing a printing apparatus to print out the prints, etc.) are disparate, and the respective apparatuses (e.g., a server for performing image management processes and the like and a server for performing printing related processes) for carrying out the respective process are of different configurations. Further, in order to configure these apparatuses of different configurations, different know-how is required for each of the respective apparatuses, whereby it becomes difficult for a single vendor to configure a complete system providing both the image data management and image printing systems. Therefore, a demand has developed for image data management servers for storing image data to be configured by a vendor having expertise in databases, and printing servers for performing printing related processes to be configured by another vendor, who has expertise in printing systems.

However, if an image management service that is divided into an image data management server for storing and organizing image data and an image printing server for performing printing related processes, wherein a vendor proficient in storage technology operates the image data management server and another vendor proficient in printing technology operates the printing server is provided, because the user has to access both the image storing server and the printing server to send from the image managing server to the printing server the image data desired to be printed when image data stored in the image data management server is to be printed out by the printing server, and to issue the command to print at the printing server, the burden on the user is troublesome.

SUMMARY OF THE INVENTION

The present invention has been developed in consideration of the foregoing circumstances, and it is an object of the present invention to provide an image management service, an image managing server and an image printing server capable of dividing the image management service into a service that manages image data and a service that performs printing related processes on the image data, while providing a high degree of convenience to the user.

The image managing server according to the present invention comprises:

a storage means for storing image data, a selecting means for selecting through the user terminal a desired image data from the image data stored by the storage means, a command receiving means for receiving through the user terminal a print command for the selected image data, and a service implementing means for sending the data indicating the storage location of the selected image data to an image printing server, which is capable of downloading the corresponding image data and performing the printing related processes, when a print command has been received at the command receiving means, connecting the image printing server to the user terminal apparatus, and causing the printing related processes to be performed within the image printing server.

Here, the referents of "print command" include any representation expressing the will of the user to print a desired selection; more specifically for example, the depressing of the "print" button provided on the command receiving means, or the clicking on the "print" tab in the menu bar.

Further, the referents of "printing related processes" include the reception of the printing conditions settings, the performance of the processes causing the printing apparatus to print out the desired images, and the like.

The image printing server according to the present invention is an image printing server that establishes a connection with the user terminal when the image managing server for storing image data receives a print command through the user terminal, comprising a receiving means for receiving from the image managing server the data indicating the storage location of the image data, a settings receiving means for receiving through the user terminal the printing conditions settings for printing the images represented by the image data, an image data obtaining means for downloading the image data from the storage location thereof, and a printing means for sending the image data obtained by the image data obtaining means and the printing conditions received by the settings receiving means to a printer apparatus connected by a network.

Here, "sending the image data obtained by the image data obtaining means and the printing conditions settings received by the settings receiving means to a printer apparatus" can refer to an autonomous transmission of the image data and the printing conditions from the printing means to the printer apparatus, or to an on-demand transmission carried out by temporarily recording the image data and the printing conditions on a recording apparatus such as a hard disk or the like, after which the image data and the printing conditions are downloaded by the printer apparatus.

The image service system according to the present invention is an image service system comprising an image managing server and an image printing server, wherein the image managing server comprises a storage means for storing image data, a selecting means for selecting through the user terminal a desired image data from the image data stored by the storage means, a command receiving means for receiving through the user's terminal a print command for the selected image data, and a service implementing means for sending, when a print command has been received at the command receiving means, the data indicating the storage location of the selected image data to an image printing server capable of downloading the corresponding image data and performing the printing related processes, connecting the image printing server to the user terminal apparatus, and performing the printing related processes within the image printing server, wherein the image printing server comprises:

a receiving means for receiving the data indicating the storage location of the image data from the image managing server, a settings receiving means for receiving through the user terminal the printing conditions settings for printing the images represented by the image data, an image data obtaining means for downloading the image data from the storage location thereof, and a printing means for sending the image data obtained by the image data obtaining means and the printing conditions received by the settings receiving means to a printer apparatus connected by a network.

According to the image managing system, which comprises an image managing server and an image printing server, of the present invention: when the image managing server receives a command to print a specified predetermined image from the image data stored therein, because the image managing server sends data specifying the storage location of said image data to the image printing server, connects the user terminal and the image printing server, and causes the printing related processes to be carried out in the image printing server, the image managing server and the image printing server can be provided separately as independent units. Therefore, the service provider only has to configure a server that is within their field of expertise, and the user can receive both an image data managing service and an image printing service without even knowing that two servers are being accessed, whereby the system is advantageous to both the providers and users.

The image managing server and the image printing server according to the present invention make possible the image service system of the present invention.

DESCRIPTION OF THE PREFERRED EMBODIMENTS

Hereinafter the preferred embodiments of the present invention will be explained with reference to the attached drawings.

Figure 1:
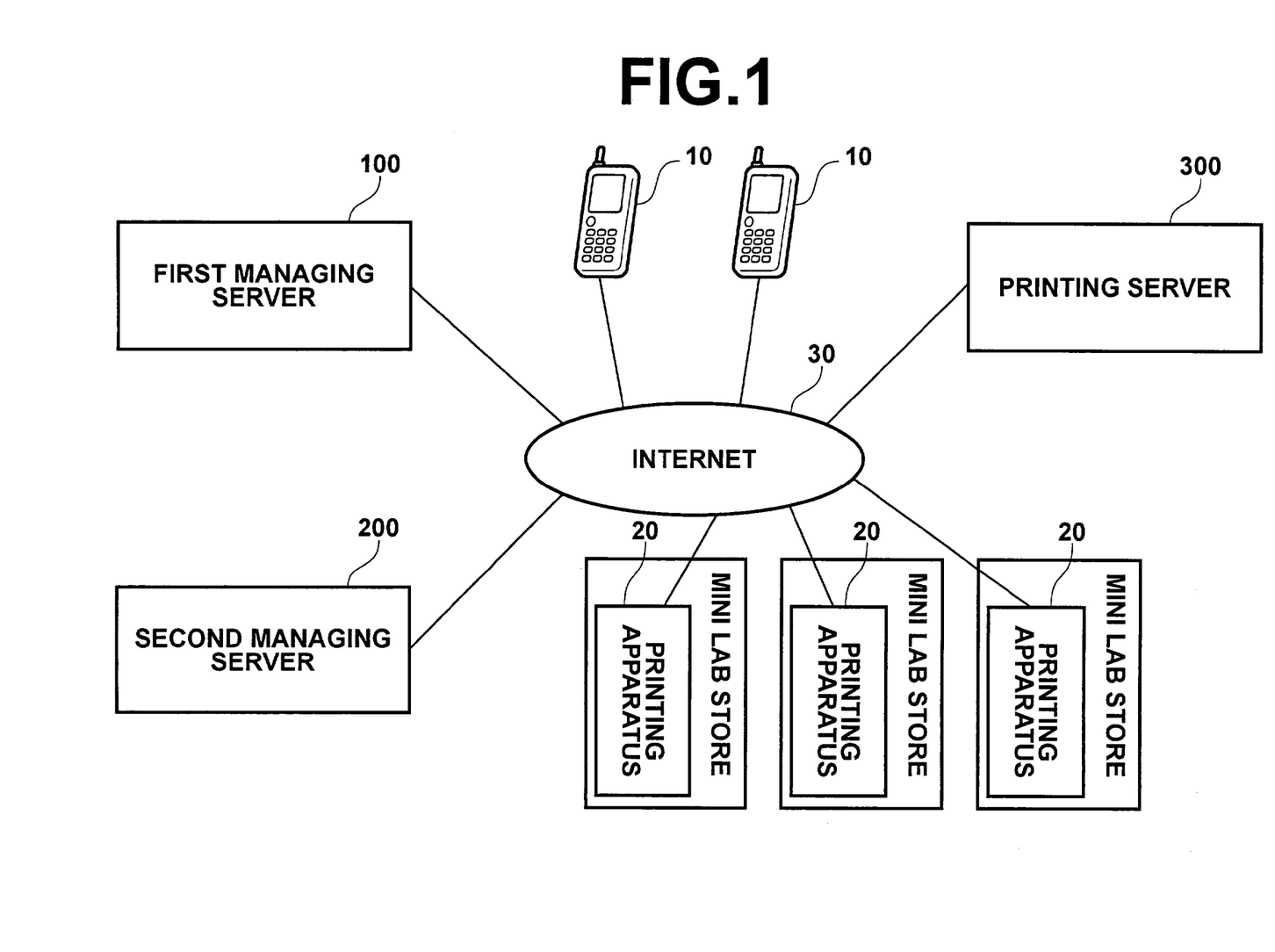
FIG. 1 is a block diagram of an embodiment of the image service system according to the present invention.

FIG. 1 is a block diagram showing the configuration of an embodiment of the image service system according to the present invention. FIGS. 2A, 2B, 3A and 3B are block diagrams showing the structures of an embodiment of a first managing server 100 and a second managing server 200 according to the present invention, which are utilized in the image service system of FIG. 1. FIG. 4 is a block diagram showing the structure of an embodiment of the image printing server 300 according to the present invention, which is utilized in the image service system of FIG. 1. Note that the current embodiment of the image service system of the present invention is for application with respect to a user utilizing a mobile telephone as the client terminal.

As shown in FIG. 1, the image service system of the current embodiment comprises: a first managing server 100 for storing and managing image data that has been transmitted thereto over an internet 30 by a user utilizing a user terminal, that is, a mobile phone 10; a second managing server 200 for managing image data specified by the user from among the image data being stored in the first managing server 100 to be stored permanently; and a printing server 300 for receiving from the first managing server 100 or the second managing server 200 data (URL) indicating the storage location of a selected image data, when the user has issued a command through the mobile phone 10 to print said image data stored in the first managing server 100 or the second managing server 200, while being connected by the first managing server 100 or the second managing server 200 to the mobile phone 10, performing printing related processes (receiving the printing conditions from the user terminal as described below, and sending the downloaded image data and the received printing conditions to a printing apparatus). Upon reception from the first managing server 100 or the second managing server 200 of the URL of the selected image data and while being connected to the mobile phone 10, the printing server 300 prompts the user through the mobile phone 10 to set the various printing conditions that apply in printing said image data, e.g. the settings for the print delivery method (postal delivery, pickup at store, etc.), the store at which the print is to be received in the case of pick up at store delivery, the print size, the number of prints, and the like, downloads the image data from the received URL, sends the image data and the printing conditions that have been set for said image data to the printing apparatus 20 of the receiving mini lab store, from among the mini lab photo stores having printing apparatuses 20 which perform the actual printing out of image data, and causes the printing out to be performed.

According to the current embodiment, although a web page is utilized as the user interface between the first managing server 100, the second managing server 200 and the user terminal, that is, the mobile phone 10, for the sake of simplicity, the details of the configuration of the web page screen will not be described in particular below.

Figure 2A:
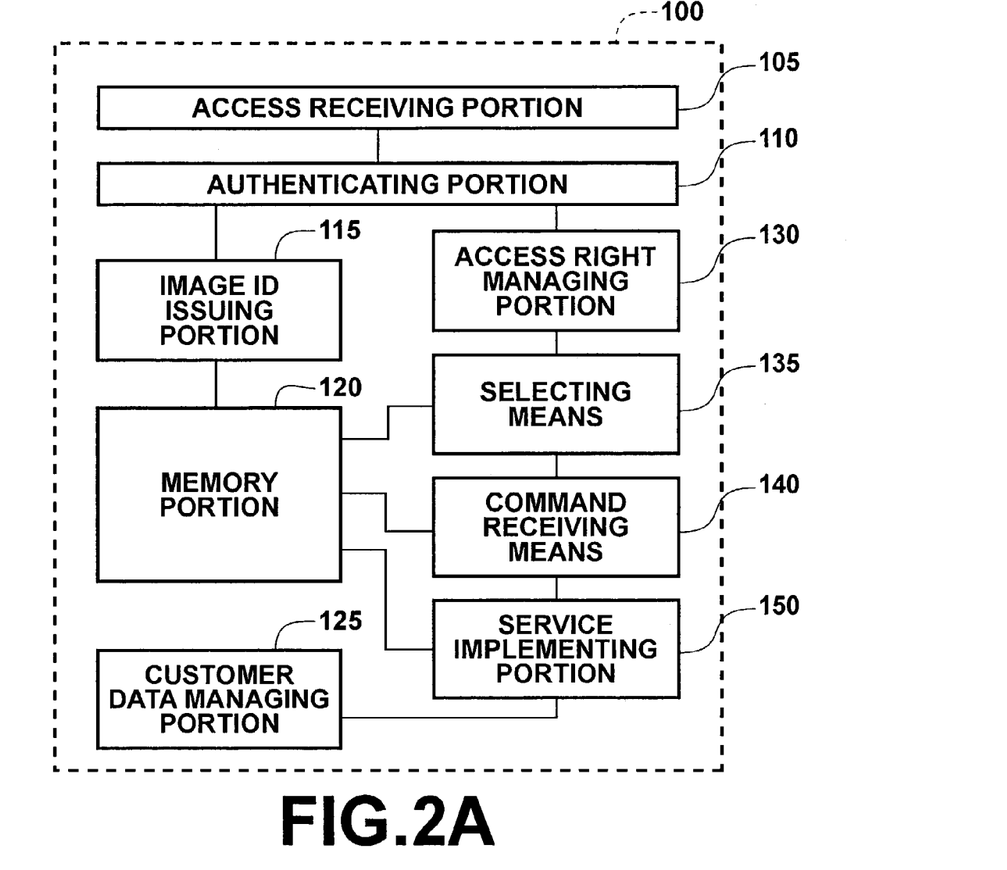
FIGS. 2A and 2B are block diagrams showing the structure of an embodiment of a first managing server 100 according to the present invention, with which the image service system of FIG. 1 has been equipped.

FIG. 2A is a schematic drawing of the first managing server 100. As shown in FIG. 2A, the first managing server 100 comprises: an access receiving means 105 for receiving an access request from the mobile phone 10 and reading out the telephone number and apparatus type data of the accessing mobile phone 10; a registration authentication means 110 for recording a user password the first time the phone number of the mobile phone 10 accesses the first managing server 100 and prompting the user to input the password so as to authenticate the user registration; an image ID issuing portion 115 for issuing, when the first managing server 100 has been accessed by the mobile phone 10 in order to upload image data, a unique image ID to the image data sent thereto; a memory portion 120 for attaching the image ID to the image data and storing said image data in the area that has been assigned to the phone number of the mobile phone 10; an access right managing portion 130 for verifying, when the access request from the mobile phone 10 is for image data that has already been stored in the memory portion 120, whether or not the phone number of the mobile phone 10 has an access right to the stored image data, and denying access to a mobile phone 10 that does not have an access right to the stored image data; a selecting portion 135 for displaying, when the accessing mobile phone 10 has an access right to the stored image data, the image data said mobile phone 10 has an access right to as thumbnail images so that the user can select the desired image data therefrom; a command receiving portion 140 for displaying on the screen of the mobile phone 10 the service menu for the selected image data so that the user can specify the services to be provided with respect to the selected image data, and receiving said specified service commands; a service executing portion 150 for performing the service according to the received service commands received by the command receiving portion 140; and a customer data managing portion 125 for managing the name, address and the like of each mobile phone owner, according to the phone number of the respective mobile phone.

The first managing server 100 of the current embodiment is operated by the mobile phone vendor of the mobile phone that uploads image data, and it is possible to obtain, based on the phone number of the mobile phone, the customer data of the user of said mobile phone from the customer data managing portion 125.

Further, although it is a matter of course that the access right managing portion 130 verifies the access right of each mobile phone having the same phone number as a mobile phone that has uploaded image data stored in the area assigned thereto in the memory portion 120, the access right managing portion 130 may also verify that the accessing mobile phone is a mobile phone to which the access right has been assigned. Note that the access right managing portion 130 is provided with an access right setting portion (not shown); the access right setting portion sets the permission for a phone number to have an access right. More specifically, if a phone number is registered at the access right setting portion, by the mobile phone when image data has been uploaded or a mobile phone having the same phone number as said mobile phone (hereinafter referred to as an image data owner's phone: e.g., a mobile phone to which a subscriber has changed and transferred their same number) as having permission to access image data being stored in the area which has been assigned to said phone number, the access right managing portion 130 permits access by the mobile phone having the phone number that has been registered. In this manner, an owner of image data can send the address (URL) of the first managing server 100 which manages their image data to a friend or the like to show and share the photographic images they have taken. However, although the access right managing portion 130 grants all access rights (described below: the right to issue the commands to "display", "edit", "print") only to the mobile phone of the owner of the image data, the access right managing portion 130 grants only the right to peruse ("display") image data to other mobile phones having a registered phone number.

The image ID issuing portion 115 attaches a unique image ID to each image data that has been uploaded from the mobile phone 10. Note that according to the current embodiment, the image ID is an ID associated with the phone number of the mobile phone 10.

Figure 2B:
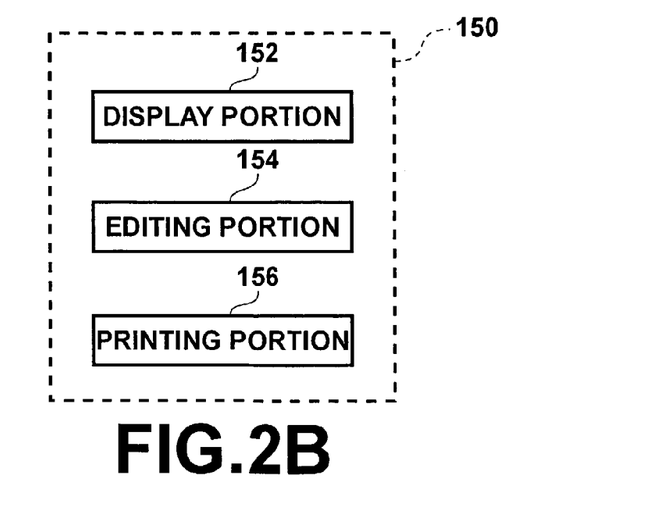

The command receiving portion 140 for receiving service commands applying to the image data selected by the selecting portion 135 receives one of the service commands, which are "display", "edit", and "print", from a user having an access right corresponding to the service command, and the service executing portion 150 executes the command for the service specified by the user. FIG. 2B is a block diagram showing the configuration of the service executing portion 150 shown in FIG. 2A. As shown in FIG. 2B, the service executing portion 150 comprises: a display portion 152 for displaying, when the user has selected an image to be displayed from among the thumbnail images displayed by the selecting portion 135 and issued the display command (e.g., when the user selects a desired image data from the thumbnail images and clicks on the "display" button on the service menu, when the user double clicks on the thumbnail image of a desired image data, etc.), the selected image data; an editing portion 154 for performing editing specified by the user on the selected image data when the editing command has been issued for said image data; and a printing processing portion 156 for performing printing processes when the print command has been issued for the selected image data. Here, the operations of the display portion 152, the editing portion 154 and the printing processing portion 156 will be explained more specifically.

The display portion 152 displays the image data selected by a mobile phone 10 having an access right. The display portion 152 is provided with a database (not shown) related to the display capabilities (e.g. black and white or color, number of pixels, number of colors, screen size, and the like) for each type of mobile phone. The display portion 152 searches, based on the mobile phone type data received for the mobile phone 10 from the access means 105, the data base for the display capabilities of the mobile phone requesting access, converts the image data to a format matching the display capabilities of the mobile phone 10, and displays the image. In a case, for example, in which the selected image data represents a color image, but the mobile phone requesting access can only display black and white images, the display portion 152 converts said color image data to monochrome image data (binary values) and displays the image. When the number of pixels of the selected image data is less than that of the display capabilities of the mobile phone requesting access, for example, said image data can be subjected to an interpolation process or the like and the image displayed. Note that if the selected image data is monochrome image data but the accessing mobile phone has a color display, because color data cannot be obtained from the image data, format conversion is not performed. In this manner, even when an owner of image data who has upgraded their mobile phone requests access, or grants access to their image data to a friend who has a different type of mobile phone, it is possible for the image data to be displayed in a format matching that of the accessing mobile phone.

The editing portion 154 provides editing services for editing image data stored in the storage portion 120. Note that according to the current embodiment, the editing portion 154 can perform the standard editing processes through the mobile phone 10, such as deleting image data, changing the order of the image data, creating a photo album, and the like, as well as the additional editing process of "permanent save". More specifically, when the commands "edit"—"permanent save" are received at the command receiving portion 140 for image data selected at the selecting means 135, the editing portion 154 sends the data indicating the storage location (the URL of the first managing server 100) of the selected image data and the image ID of the selected image data to the second managing server 200, and sends to the user through the mobile phone 10 data indicating the location of the second managing server 200 (the URL of the second managing server 200) that is to perform the permanent saving service.

The printing processing portion 156 operates when a print command for the selected image data has been received by the command receiving portion 140. When a print command for the selected image data has been received by the command receiving portion 140, the printing processing portion 156 sends the data indicating the storage location (the URL of the first managing server 100) of the selected image data and the image ID of the selected image data to the printing server 300, connects the accessing mobile phone 10 and the printing server 300, and causes the printing related processes to be performed in the printing server 300.

The printing processing portion 156 creates destination address data for the print that has been printed out, and sends said destination address data and the image ID of the selected image data to the printing server 300; the printing processing portion 156 is provided with a destination address managing portion (not shown), which is described below.

Figure 3A:
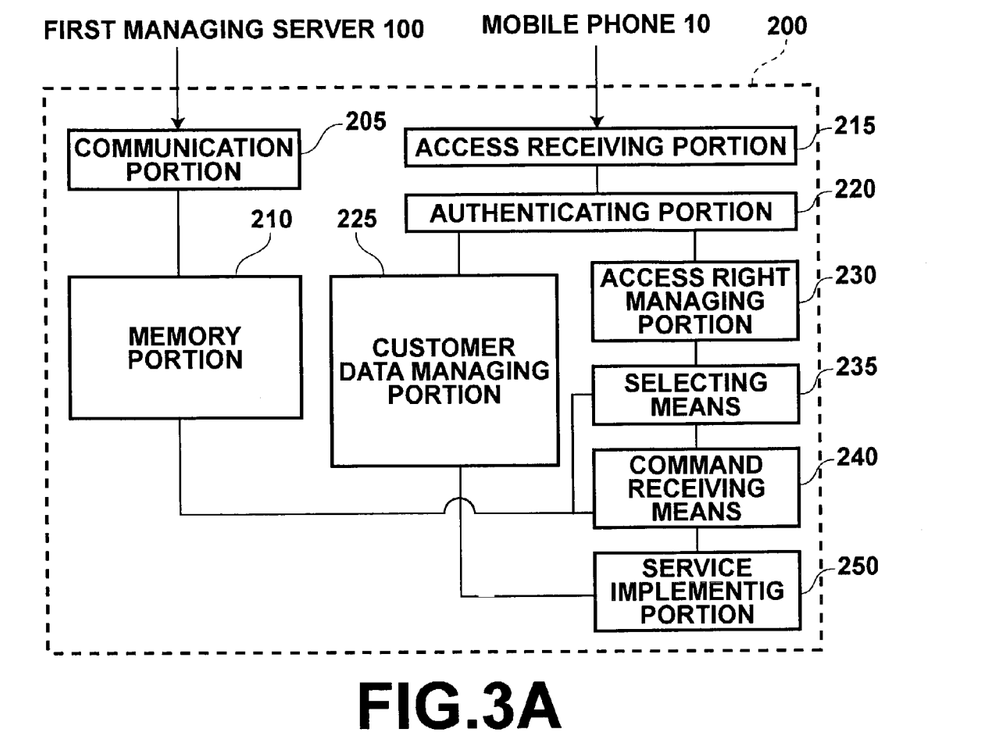
FIGS. 3A and 3B are block diagrams showing the structure of an embodiment of a second managing server 200 according to the present invention, with which the image service system of FIG. 1 has been equipped.
Figure 4:
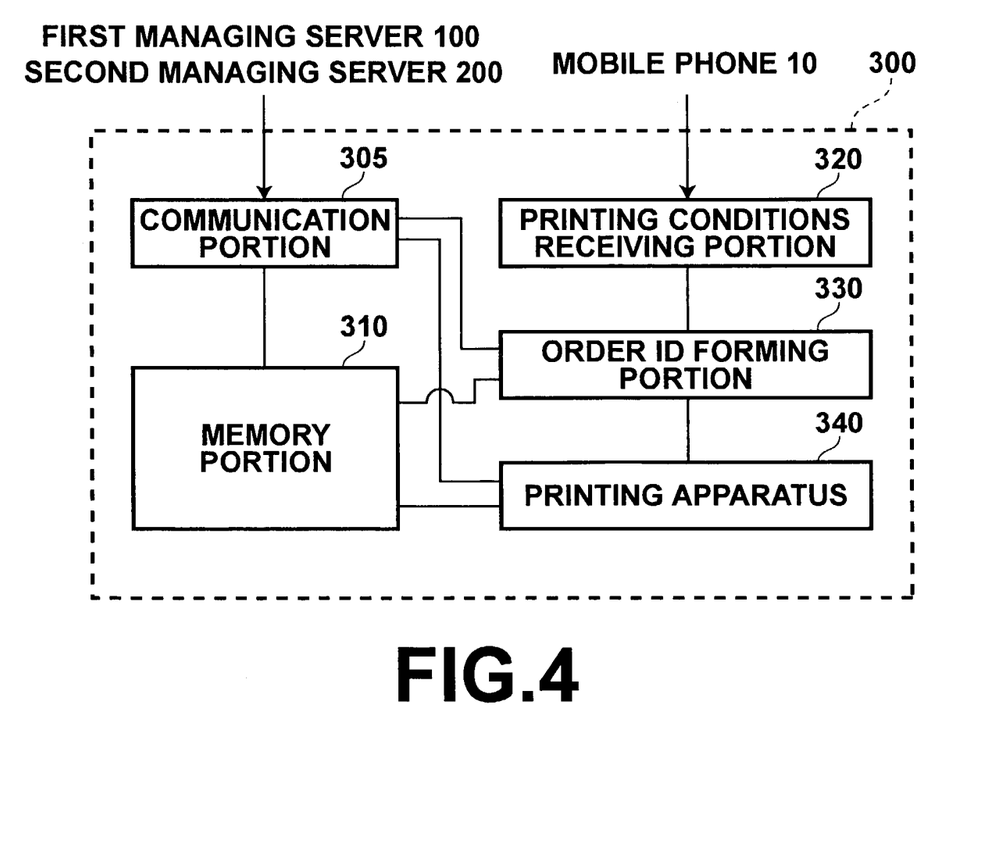
FIG. 4 is a block diagram showing the structure of an embodiment of an image printing server 300 according to the present invention, with which the image service system of FIG. 1 has been equipped.

FIG. 3A is a schematic drawing of the configuration of the second managing server 200. As shown in FIG. 3A, the second managing server 200 comprises: a communications portion 205 for downloading, based on the URL and the image ID of the selected image data which have been received from the first managing server 100, the selected image data, and for reading out the phone number of the mobile phone, which is included in the image ID, of the owner of the image data; a memory portion 210 for attaching an image ID to the image data downloaded by the communications portion 205 and storing the downloaded image data for the phone number of the mobile phone of each image data owner; an access receiving portion 215 for receiving access from the mobile phone 10 and reading out the phone number and the type data of the mobile phone from the accessing mobile phone 10; a authentication portion 220 for recording, in the case that it is the first time an access has been received from said phone number of the mobile phone 10, the customer data such as the name, address and the like, as well as a password, and for prompting, in the case that the customer data and password for the phone number of the accessing mobile phone 10 has already been registered, the user to input their password and authenticating the user registration; a customer data managing portion 225 for storing the customer data registered at the authentication portion 220 for the phone number of each registered mobile phone 10; an access managing portion 230 for verifying whether or not the phone number of a mobile phone 10 requesting access has an access right to the image data being stored in the memory portion 210, and refusing access to the mobile phone 10 if the mobile phone 10 does not have an access right to said image data; a selecting portion 235 for displaying, for a mobile phone 10 having an access right, as thumbnail images the image data to which said mobile phone 10 has an access right so that the user can select a desired image data; a command receiving portion 240 for providing a service command menu for the selected image data so that the user can specify a command for a desired service; and service executing portion 250 for performing the service according to the service command issued by the command receiving portion 240.

The second managing server 200 according to the current embodiment is a server for managing image data from among the image data that the user has uploaded to the first managing server 100 and wishes to have stored permanently. Because it is presumed that the second managing server 200 is operated by a vendor other than the mobile phone vendor, although the phone number of an accessing mobile phone 10 can be read out, in order to protect customer privacy the customer data such as name, address and the like cannot be obtained from the first managing server 100. Therefore, the customer data of a user having a mobile phone 10 that has accessed the second managing server 200 is obtained by the user registration process performed in the authentication portion 220.

Further, though it is a matter of course the access right managing portion 230 grants access rights to the accessing mobile phone if the accessing mobile phone has the same phone number as the phone number of the mobile phone of the owner of the image data stored in the respective area assigned thereto in the memory portion 210 and has been registered by the user, the access right managing portion 230 may also verify that the accessing mobile phone is a mobile phone to which the access right has been assigned. Note that the access right managing portion 230 is provided with an access right setting portion (not shown); the access right setting portion can set permission for a phone number to have an access right. More specifically, if a phone number is registered at the access right setting portion registers, by the mobile phone having the phone number of the image data owner's phone, as having permission to access image data being stored in the area which has been assigned to said phone number, the access right managing portion 230 permits access by the mobile phone having the phone number that has been registered. In this manner, an owner of image data can send the address (URL) of the second managing server 200 which manages their image data to a friend or the like to show and share the photographic images they have taken. However, although the access right managing portion 230 grants all access rights (described below: the right to issue commands to "display", "edit", "print") only to the mobile phone of the owner of the image data, the access right managing portion 230 grants only the access right to peruse ("display") image data to other mobile phones having a registered phone number.

Figure 3B:
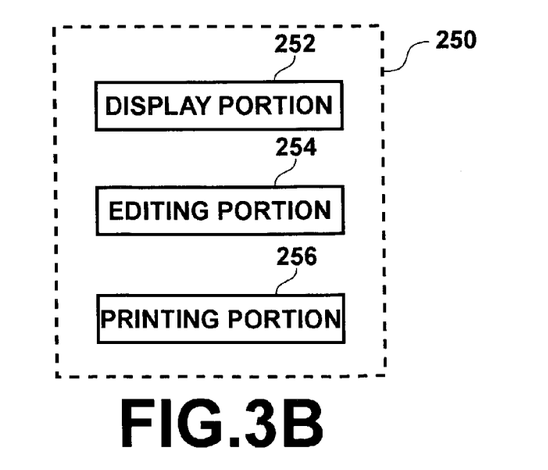

The command receiving portion 235 for receiving service commands applying to the image data selected by the selecting portion 135 receives one of the service commands, which are "display", "edit", "print", from a user having an access right corresponding to the service command, and the service executing portion 250 executes the command for the service specified by the user. FIG. 3B is a block diagram showing the configuration of the service executing portion 250 shown in FIG. 3A. As shown in FIG. 3B, the service executing portion 250 of the second managing server 200 comprises, in the same fashion as the service executing portion 150 of the first managing server 100: a display portion 252 for displaying, when the user has selected an image to be displayed from among the thumbnail images displayed by the selecting portion 235 and issues the display command (e.g., when the user selects a desired image data from the thumbnail images and clicks on the "display" button on the service menu, when the user double clicks on the thumbnail image of a desired image data, etc.), the selected image data; an editing portion 254 for performing editing specified by the user on the selected image data when the editing command has been issued for said image data; and a printing processing portion 256 for performing printing processes when the print command has been issued for the selected image data. Here, because the operations of the display portion 252 of the second managing server 200 are the same as those of the display portion 152 of the first managing server 100, further explanation thereof is omitted.

Note that the editing portion 254 of the second managing server 200 provides editing services to image data which is stored in the memory portion 210. These editing services are standard services such as deletion of image data, changing the order of image data, and creation of photo albums. However, the "permanent save" service provided by the editing portion 154 of the first managing server 100 is not performed by the editing portion 254.

The printing processing portion 256 operates when a print command for the selected image data has been received by the command receiving portion. When a print command for the selected image data has been received by the command receiving portion 240, the printing processing portion 256 sends the data indicating the storage location (the URL of the second managing server 200) of the selected image data and the image ID of the selected image data to the printing server 300, connects the accessing mobile phone 10 and the printing server 300, and causes the printing related processes to be performed in the printing server 300. The printing processing portion 256, in the same manner as occurs in the first managing server 100, creates the destination address data of the print that has been printed out, and sends said destination address data and the image ID of the selected image data to the printing server 300; the printing processing portion 256 is provided with a destination address managing portion (not shown) which is described below.

FIG. 4 is a block diagram of the configuration of the printing server 300 according to the present embodiment. The printing server 300 receives the URL of image data selected from the first managing server 100 or the second managing server 200 (the data indicating the storage location of the selected image data) and the image ID, and connects to said mobile phone 10, when a print command issued by the user through the mobile phone 10 for the selected image data has been received at the first managing server 100 or the second managing server 200. As shown in FIG. 4, the printing server 300 comprises a communication portion 305 for communicating with the first managing server 100 or the second managing server 200; a memory portion 310 for recording and storing image data obtained from the first managing server 100 or the second managing server 200; a conditions receiving portion 320 for receiving, when connected to the mobile phone 10, the printing conditions that have been set by the user through the mobile phone 10; an order ID forming portion 330 for receiving the printing conditions, forming an order ID associated with the print request when the print request has been confirmed and notifying the user through the mobile phone 10, and also sending, for cases in which a print delivery method of "postal delivery" has been selected at the command receiving portion 320, the printing conditions and the order ID associated therewith to the printing processing portion (the printing processing portion 156 or 256) of the managing server to which the order ID applies; and a print executing portion 340 for sending the destination address data for said order ID that has been sent through the communication portion 305 of the destination address managing portion of the printing processing portion 156 or 256 as well as the image data to be printed and the printing conditions to the printing apparatus 20 of the mini lab store specified in the printing conditions. Note that the referents of "the mini lab store specified in the printing conditions" include for example: when the user has set through the conditions settings receiving portion 320 "pickup at store" as the delivery method, the specified mini lab store; when "postal delivery" has been set as the delivery method, the mini lab store geographically nearest the destination address that has been sent through the printing processing portion 156 or 256, as determined based on said destination address.

Here, the operation of the printing processing portions 156 and 256, which are responsible for forming the destination address, will be explained. When the destination address forming portion (not shown) of the printing processing portions 156 and 256 receive the order ID from the printing server 300, the printing processing portion 156 or 256 reads out from the image ID data included in said order ID the phone number of the mobile phone 10 of the user requesting the print, then reads out the customer data of the user owning said mobile phone from the respective customer data receiving portion 125 or 225, forms, based on the read out customer data, the destination address data of the print, correlates said destination address data with the order ID, and sends said order ID and the associated destination address data to the printing server 300.

Generally, in order to protect the privacy of the user, the first managing server 100 and the second managing server 200 are not permitted to provide the customer data of a user requesting a print to another vendor who operates the printing server 300. According to the current embodiment, by providing each of the respective printing processing portions (156 and 256) of the first managing server 100 and the second managing server 200 with a destination address managing portion, because a destination address corresponding to the order ID is formed and sent to the printing server 300, the user's privacy can be protected and the print printed out at a mini lab store or the like can be delivered with no problems.

Note that the communication portion 305 of the printing server 300 receives the URL of the image data and the image ID from the first managing server 100 or the second managing server 200, accesses the received URL and downloads the target image data, and sends the order ID formed by the order ID forming portion 330 and the image TD of the image data that is the object of said print order to the respective printing processing portion of the corresponding managing server (the printing processing portion 156 of the first managing server 100 or the printing processing portion 256 of the second managing server 200), receives the destination address data returned from the printing processing portion 156 or 256, and provides said destination address data to the print executing portion 340.

Heretofore, the configuration of the image service system according to the current embodiment and the operation of the components thereof have been explained. Hereinafter, with reference to FIGS. 5, 6 and 7, the operation of the current embodiment will be explained in more detail.

Figure 5:
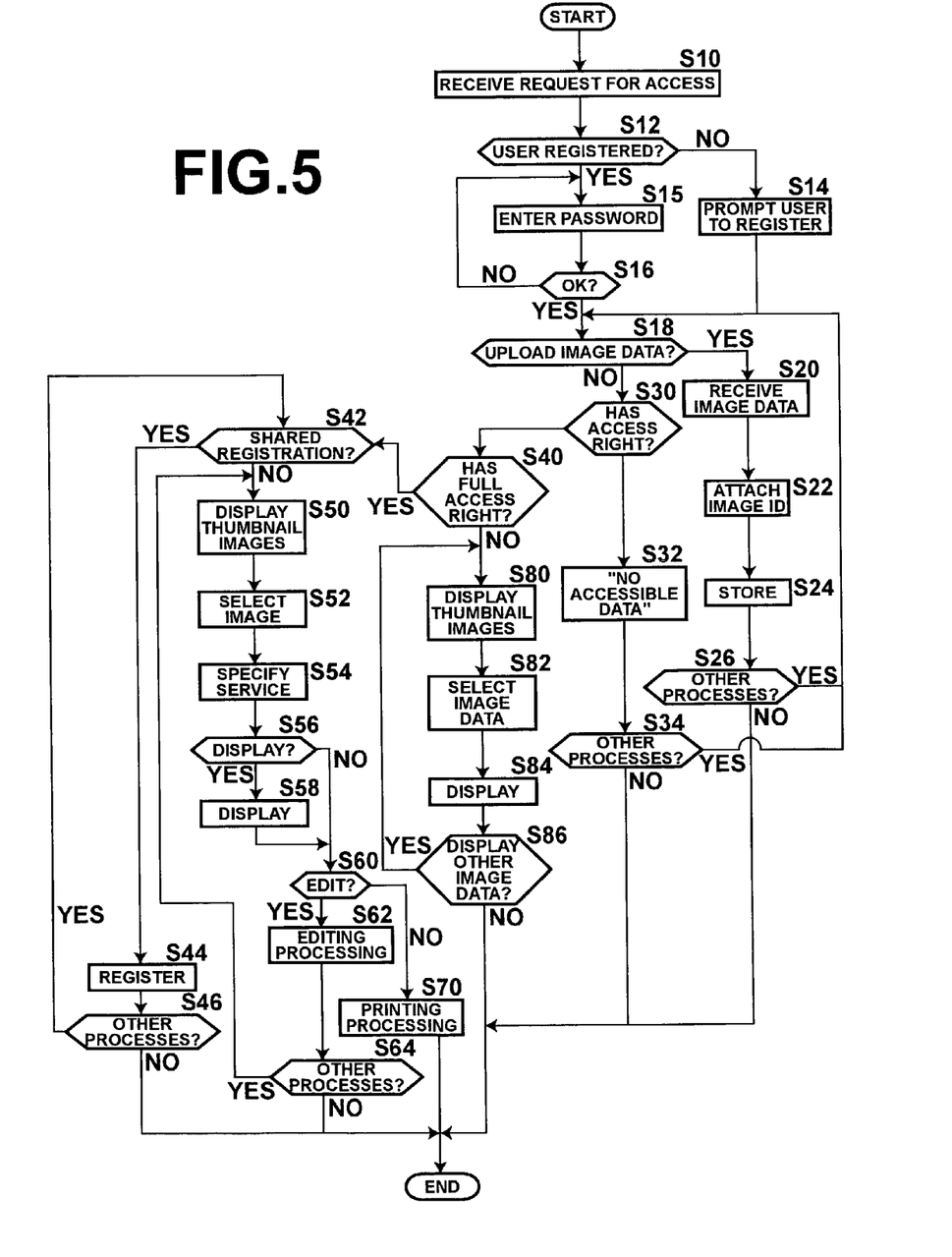
FIG. 5 is a flowchart of the operation of the first managing server 100.

FIG. 5 is a flowchart of the operation of the first managing server 100 shown in FIG. 1. As shown in FIG. 5, when the first managing server 100 receives at the access receiving portion 105 a request for access from a mobile phone 10 over an internet 30, the first managing server 100 reads out the phone number and mobile phone type of said mobile phone 10, and the verification portion 110 checks whether or not the user registration for the mobile phone having said phone number has been completed (steps S10, S12). If the user is not registered, the user is prompted to register a password and complete the registration process (step S12: No. S14). However, if the request for access is from a mobile phone having a phone number for which the user registration has already been completed, the user is prompted to enter their password, and user verification is performed (steps S15, S16) Because the first managing server 100 can obtain the customer data and the like of the user from the phone number, the user registration process of the first managing server 100 consists of the password registration process.

If the correct password is entered (step S16: Yes) or user registration is carried out (S14), and the request for access from the user is to upload image data (S18: Yes), the first managing server 100 receives the transmitted image data and the image ID issuing portion 115 attaches a unique image ID to each image data received thereby (steps S20, S22). Note that the image ID is an ID that includes data representing the phone number of the mobile phone 10 that has transmitted the image data. The image data to which an image ID has been attached is stored within the area assigned by the memory portion 120 to the phone number of the mobile phone 10 (step S24). If no other processes are to be performed (step S26: No), the first managing server 100 performs logout processing for the mobile phone 10, and the processing is complete; however, if there are other processes to be performed (step S26: Yes), the processing returns to S18.

On the other hand, in step S18, for cases in which the request for access from the mobile phone 10 is for accessing image data stored in the memory portion 120 (S18: No), the access right managing portion 130 checks the access right of said mobile phone 10 (S30). If the phone number of the mobile phone 10 is neither the phone number of the mobile phone of the owner of any of the image data stored by the memory portion 120 nor a phone number that has been registered to have a viewing access right (S30: No), the access right managing portion 130 sends a message reading "no accessible data" (S34: 32); if said mobile phone has other processes to be performed (in this case, the only possible process is the uploading of image data) (S34: Yes), the processing returns to S18, if there are no other processes to be performed (S34: No), the logout process is performed for the mobile phone 10 and the processing is complete.

In step S30, if the phone number of the mobile phone 10 requesting access is a phone number that has an access right to any of the image data stored in the memory portion 120 (step S30: Yes), the access right managing portion 130 further checks the type of access right of the mobile phone 10 (S40). If the mobile phone 10 is the mobile phone of an owner of any of the data stored in the memory portion 120, a determination is made that said mobile phone 10 has access to the corresponding image data (S40: Yes): shared registration (registering another phone number as having permission to view one's own image data) (S42: Yes, S44, S46), as well as the "display", "edit", and "print" user commands can be performed through said mobile phone 10. In performing the service commands specified by a user, first, the selecting portion 135 displays as thumbnail images the image data stored in the area of the memory portion 120 assigned to the phone number of the mobile phone 10 for the user to select from (S42: No, S50, S52). Then, the service executing portion 150 performs, on the selected image data, the service of the service command, "display", "edit", or "print" received by the command receiving portion (S54-S70). That is to say, if the display command is specified the selected image data is displayed (S56: Yes, S58), if the edit command is specified editing processes are performed on the selected image data (S56: No, S60: Yes, S62), and if there are no other processes to be performed (S64: No) the logout process is performed for the mobile phone 10; however, if the print command is specified (S60: No) the data indicating the storage location of the selected image data (the URL of the first managing server 100) and the image ID are sent to the printing server 300, the mobile phone 10 and the printing server 300 are connected and the printing processes are performed (S70), and the processing of the first managing server 100 is complete. Note that although not shown in the drawings, the printing processes of S70 include the processes of reading out, when the order ID is subsequently received from the printing server 300, the phone number of the mobile phone of the owner of the image data which is the object of the print order from the image ID included within the order ID, forming a destination address data based on the read out phone number, correlating the destination address data and the order ID, and sending the order ID and associated destination address data to the printing server 300.

Note that the editing processes that take place in S62, that is, the editing processes performed by the editing portion 154 of the first managing server 100, include the standard editing processes such as deleting image data, arranging the order of the image data, creating a photo album, and the like, in addition to featuring an editing process wherein the editing portion 154 sends the image ID of the selected image data as well as the URL of said image data to the second managing server 200, and sends to the user through the mobile phone 10 URL address of the second managing server 200 in which the permanent saving of said image data is to be carried out.

On the other hand, in S40, if the mobile phone 10 is a mobile phone having a phone number which has been share-registered by the owner of image data, the access right managing portion 130 determines that the mobile phone 10 has a viewing access right to the corresponding image data, (S40: No). The selecting means 135 displays as thumbnail images through the mobile phone 10 the images data the mobile phone 10 has a viewing access right to so that the user of the mobile phone 10 can select a desired image data, and the selected image data is displayed on the mobile phone 10 by the display portion 152 of the service executing portion 150 (S80, S82, S84). If there is other image data that the user of the mobile phone 10 wishes to view (S86: Yes), the steps S80 through S84 are repeated; however, if the user does not want to view other image data (S86: No), the logout process is performed for the mobile phone 10 and the processing is complete.

When the image ID and URL of an image data are received from the editing portion 154 of the first managing server 100, the communication portion 205 of the second managing server 200 accesses the first managing server 100, downloads the corresponding image data, and stores the image data in an area of the storage memory portion 210 allocated for each phone number. The second managing server 200 manages the image data from among the image data managed by the first managing server 100 that has been specified to be permanently saved by the owner of said image data; the operation of said server when said server receives a request for access from a mobile phone 10 is shown in the flow chart of FIG. 6.

Figure 6:
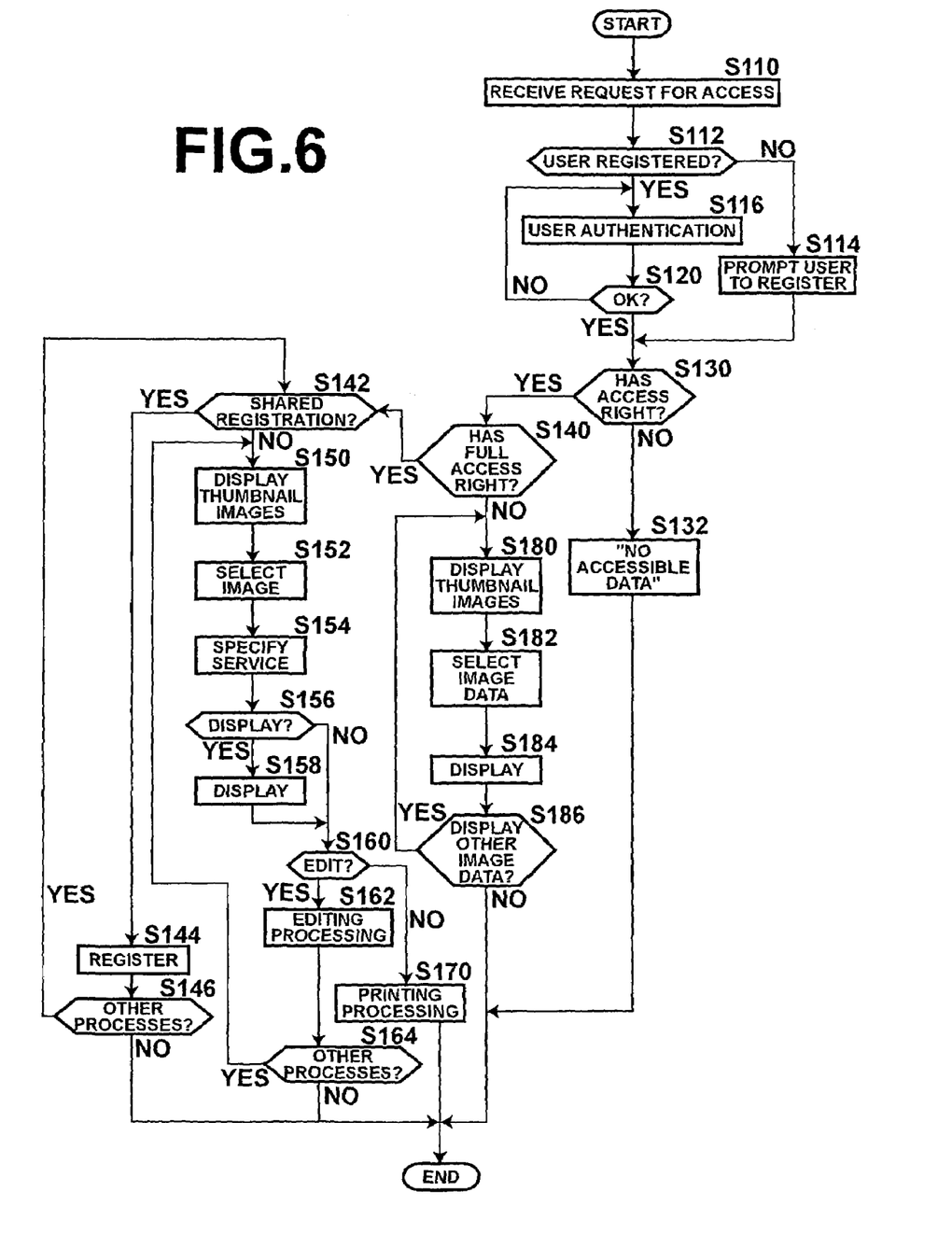
FIG. 6 is a flowchart of the operation of the second managing server 200.

As shown in FIG. 6, according to the second managing server 200, the access receiving portion 215 receives a request for access from a mobile phone 10 and reads out the phone number of the mobile phone 10 (S110), and the authentication portion 220 verifies the access right of the user (S112). If the accessing mobile phone 10 has a phone number for which the user registration has already been completed, the user is prompted to enter their password, and user verification is performed (steps S112: Yes, S116). If the accessing mobile phone 10 has a phone number for which the user registration has yet to be completed (S112: No), the user is prompted to register (S114). Note that the registration process of the second managing server 200 is different from that of the first managing server 100: aside from a password, the user's name, address and the like are registered, correlated with the phone number of the mobile phone 10 and recorded in the customer data managing portion 225.

If the correct password is entered from a mobile phone 10 having a phone number for which registration has been completed (step S120: Yes), or the user registration process has been completed by a new user (S114), the verification portion 230 of the second managing server 200 checks the access right of the accessing mobile phone 10 (S130). Except for the editing processes, the process of checking the access right and the subsequent co-user registration process, service processes and the like are the same as those occurring in the first managing server 100; therefore, only the editing processes will be explained hereinafter. The editing processes performed by the editing portion 154 of the first managing server 100 include the standard editing processes (FIG. 5 step S62) such as deleting image data, changing the order of the image data, creating a photo album, and the like, as well as the additional editing process of "permanent save"; however, because the second managing server 200 stores only image data that has been specified to be permanently stored, the editing processing portion 254 thereof performs only the standard editing processes such as deleting image data, changing the order of the image data, arranging image data, creating a photo album, and the like, and does not perform the "permanent save" process.

Figure 7:
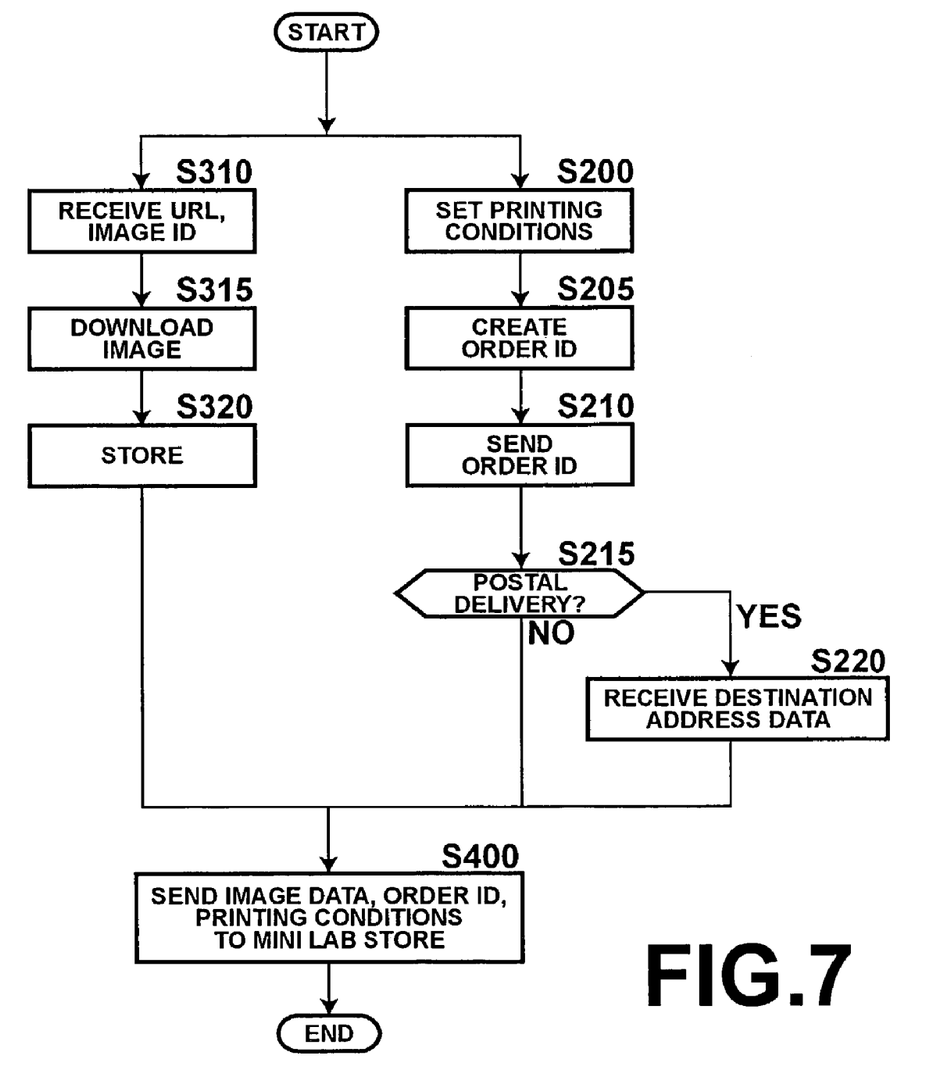
FIG. 7 is a flowchart of the operation of the printing server 300.

FIG. 7 shows the operations occurring after the printing server 300 has been connected by the printing processing portion 156 of the first managing server 100 or the printing processing portion 256 of the second managing server 200 to a mobile phone 10 that has given a print command. As shown in FIG. 7, because the printing server 300 is connected to the mobile phone 10 and has received from the first managing server 100 or the second managing server 200 the URL and image ID of an image data for which a print command has been given, the user is prompted to set the printing conditions (the delivery method, the receiving store, print size, number of prints, type of printing paper, and the like) through the mobile phone 10 (S200), the order ID forming portion 330 is caused to form a unique order ID for the image data corresponding to the received print order and of which the printing conditions thereof set and send the formed order ID to the connected mobile phone 10. For a case in which "postal delivery" has been set as the delivery method, the order ID to the printing processing portion (the printing processing portion 156 of the first managing serve 100 or the printing processing portion 256 of the second managing server 200) of the managing server from which the URL of the corresponding image data has been received (S205, S210). For the case in which "pick up at store" has been specified as the delivery method, the print executing portion 340 downloads, based on the URL address and the image ID of the image data that has been sent through the communication portion 305 from the corresponding managing server and is the object of the print order, the image data that is the object of the print order and stores the downloaded image data in the memory portion 310 (S310, S15, S320), sends said downloaded image data, the printing conditions, and the order ID for carrying out the printing of the image data to the printing apparatus 20 of the specified mini lab store that has been specified through the mobile phone 10, and causes the image data to be printed out (S215: No, S400). However, in the case that "postal delivery" has been specified as the delivery method, the print executing portion 340 receives the print destination address data sent in response from the printing processing portion of the corresponding managing server, sends said print destination address data, the order ID for the corresponding image data, and the printing conditions to the printing apparatus 20 of the mini lab store geographically nearest the destination address and prints out the image data (S215: Yes, S220, S400). Here, although the operation of the printing server 300 is complete, the printing apparatus 20 receiving the image data and order ID, the printing conditions, and in the case of postal delivery the destination address data, prints out the image data according to the printing conditions to obtain the print. In the case of postal delivery, the mini lab store at which the printing apparatus 20 is installed mails the print to the destination address indicated by the destination address data; however, in the case that the print is to be picked up at the store, the print is stocked so that the user can visit the store and pick up the print.

In this manner, according to the current embodiment, when the first managing server 100 or the second managing server 200 receives a print command from a user terminal, which is a mobile phone 10, for a specified predetermined image data stored therein, because the corresponding managing server 100 or 200 sends the URL address and the image ID of said image data to the printing server 300, connects the mobile phone 10 and the printing server 300, and causes the printing server 300 to perform the printing related processes, the respective managing server and the printing server can be provided in mutually independent configurations. Therefore, from the standpoint of the service providers, it is possible to provide the service by constructing only the server type of one's respective field of expertise. From the standpoint of the user, it is advantageous that both the image data managing service and the image data printing service can both be received by the two servers being accessed without requiring that the user be made aware of that process.

The preferred embodiment of the image service system, the managing servers, and the printing server according to the present invention have been explained above; however, the present invention is not limited to the above-described embodiment: so far as the gist of the present invention is not changed, various changes and additions are possible.

For example, although the first managing server 100 and the second managing server 200 of the embodiment of an image service system shown in FIG. 1 have been configured to provide service for client terminals that are mobile phones and employ an abbreviated registration process, the user terminals of the image managing servers according to the present invention are not limited to being mobile phones: any terminal capable of accessing a managing server via the internet can be a client terminal. Note that for cases in which the user terminal cannot identify the terminal by only accessing the server, each user can be required to register (user name, password, customer data and the like).

Further, although the according to the aforementioned embodiment the first managing server 100 and the second managing server 200 provide only the services of "display", "edit", and "print", other services, such as the promotional services described in U.S. patent application Ser. No. 10/242,770, and the like can be provided.

Still further, although the printing server 300 of the embodiment of an image service system shown in FIG. 1 sends image data or the like to a mini lab store to be printed out, the printing server 300 can also be configured so as to temporarily store the image data on a hard disk or the like, and to pass the stored image data on to the printing apparatus 20 of the mini lab store when queried thereby at periodic intervals.

Even further still, although according to the aforementioned embodiment the second managing server 200 is set up to permanently store image data image data specified by the user from among the image data stored in the first managing server, the second managing server 200 can also be set up, in accordance with the purpose for which said managing server 200 is being used, so as to store image data, from among the image data stored in the first managing server 100, of which the size is too large, or which has exceeded the storage time limit of the image managing server 100.

What is claimed is:

1. An image managing server, comprising:
    a registration authentication means for authenticating a user terminal sending an access request to the image managing server;
    a storage means for storing image data,
    a selecting means for selecting through the user terminal a desired image data from the image data stored by the storage means,
    a command receiving means for receiving through the user terminal a print command for the selected image data, and
    a service implementing means for sending, the data indicating the storage location of the selected image data to a printing server, which is capable of downloading the corresponding image data and performing the printing related processes, when the print command has been received at the command receiving means, and causing the image printing server being connected to the user terminal, to download the selected image data according to the data indicating the storage location of the selected image data and perform according to the print command.

2. An image printing server that establishes a connection with a user terminal when an image managing server for storing image data receives a print command through the user terminal, comprising
    a receiving means for receiving from the image managing server data indicating a storage location of the image data,
    a settings receiving means for receiving through the user terminal printing conditions settings for printing the image data,
    an image data obtaining means for downloading the image data from the storage location thereof, and
    a printing means for sending the image data obtained by the image data obtaining means and the printing conditions received by the settings receiving means to a printer apparatus connected by a network.

3. An image service system, comprising:
    an image managing server and an image printing server, wherein
    the image managing server comprises:
    a storage means for storing image data,
    a selecting means for selecting through the user terminal a desired image data from the image data stored by the storage means,
    a command receiving means for receiving through the user terminal a print command for the selected image data, and a service implementing means for sending, when the print command has been received at the command receiving means, the data indicating the storage location of the selected image data to a printing server which is capable of downloading the corresponding image data and performing the printing related processes, and causing the image printing server being connected to the user terminal, to download the selected image data according to the data indicating the storage location of the selected image data and perform according to the print command, the image printing server comprising:

a receiving means providing for the reception at the image printing server of the data indicating the storage location of the image data from the image managing server, a settings receiving means for receiving through the user terminal printing conditions settings for printing the images represented by the image data, an image data obtaining means for downloading the image data from the storage location thereof, and a printing means for sending the image data obtained by the image data obtaining means and the printing conditions received by the settings receiving means to a printer apparatus connected by a network.

4. The image managing server of claim 1, wherein the user terminal is a mobile phone.

5. The image service system of claim 3, wherein the user terminal is a mobile phone.

6. The image managing server of claim 1, wherein the print command specifies printing conditions setting.

7. The image service system of claim 3, wherein the print command specifies printing conditions setting.

* * * * *